Figure 1:
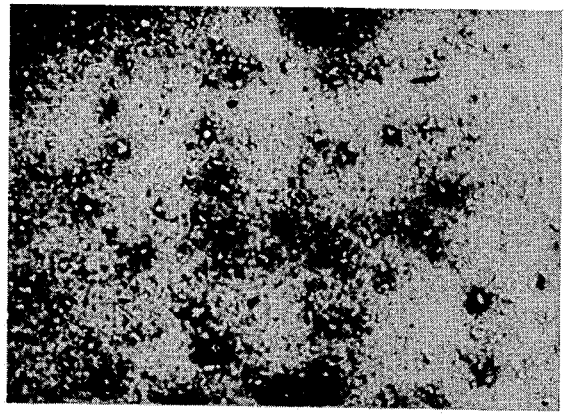

April 28, 1970　　　　H. R. DALTON　　　3,509,088
CARBON BLACK DISPERSIONS, THEIR PREPARATION
AND FILM PRODUCTS THEREWITH
Filed Sept. 15, 1966

INVENTOR.
HAROLD R. DALTON
BY A. A. Orlinger
ATTORNEY

3,509,088
CARBON BLACK DISPERSIONS, THEIR PREPARATION AND FILM PRODUCTS THEREWITH
Harold R. Dalton, 931 Rydal Road, Jenkintown, Pa. 19046
Continuation-in-part of application Ser. No. 502,614, Oct. 22, 1965. This application Sept. 15, 1966, Ser. No. 579,778
Int. Cl. C08f 45/08; B41n 1/24; B41f 15/00
U.S. Cl. 260—41                                           16 Claims This application is a continuation-in-part of my copending application Ser. No. 502,614, filed Oct. 22, 1965.

This invention concerns improvements in preparing electrically conducting or electro-sensitive or -responsive films, such as coatings or layers, for such products as recording blanks, e.g. recording sheets, stencils, printing screens, as well as for unsupported such electrically conducting films and also for films with embedded fibrous material in the form either of fibers alone or of fibrous products such as paper, woven materials as cloth, fiberglass, or other screen material, and the like.

More particularly, the invention relates, for example, to providing in an electrical-signal-responsive film having carbon black particles dispersed throughout its continuous supporting film of the film-forming resin, the capacity not only for increased precision of definition of the perforations produced by electrical impulses impinged on the film, but also for much higher transmission recording speed.

More specifically, the invention is that of imparting to such carbon-black-containing electrical-signal-responsive film the properties of its yielding not only enhanced definition and precision of reproduction but also increased transmission recording speed, by using in preparing the final conductive film providing dispersion, from which to produce said signal responsive film either or both of the steps (i) of dispersing the individual carbon black particles in a dispersion medium which provides a multi-phase resin-complex (later below defined and described as comprising a film-forming resin dispersed in both dissolved and particulate form in a volatile organic solvent) as a film-providing suspending medium for them, and (ii) before mixing the carbon black particles into such dispersion medium, milling them in an initial treating solution of an adsorbate in a volatile organic solvent for it to enable having adsorbed on the surfaces of the individual carbon black particles a so-called mono-layer (as further below defined) of an organic adsorbate of the type as further below exemplified.

Thus, an embodiment of the invention is a two-stage procedure for preparing the final conductive-film-providing suspension, wherein one stage involves making a dispersion of such mono-layer-adsorbate-coated carbon black particles, and the second stage is the preparation of a multi-phase resin-complex to be admixed with that carbon black dispersion.

Then also, another embodiment of the invention are these resulting dispersions, which may be called two-stage carbon black dispersions, for use in preparing the aforesaid films and particularly those of the high resistance type and constituting the major thickness of the recording blank, e.g. electro-sensitive stencil, as well as in preparing such coatings applied on a backing which may be an electrically conducting paper or film, metallic foil or high electrically conducting coating. This latter coating is the type which functions only to carry the recording current to the grounding strip or drum of a facsimile receiver with as little energy loss as possible.

The method of preparing the final conductive-film-providing suspension involving use of the mono-layer-adsorbate-coated carbon black dispersion is referred to as two-stage because by it the dispersion is prepared in two essential stages. In its first stage, the carbon black particles are milled with a small amount of a solution of a resin and/or some other suitable adsorbate in a readily volatile organic solvent for it, wherein the quantity of resin (and/or other adsorbate) is at least sufficient to apply a so-called mono-layer of the resin or other absorbate over the surfaces of the individual carbon black particles. The indicated result of such applied mono-layer is such strong adsorption of the adsorbate resin on the carbon black particle surfaces that attempts to remove any significant amount of the so applied resin, as by solvent extraction, were unsuccessful.

The second of the two stages involves preparing a suspending or film-forming multi-stage resin-complex which, when followed by admixing and dispersing these so called mono-layer resin- (and/or other adsorbate) coated carbon black particles in it and their mixture is cast in a layer and then dried, leaves the resulting film with the physical properties which it needs for the various operations through which the so-coated end product will be handled in its later use.

Among the adsorbates, other than the organic solvent soluble resin, which may be used alone or with any one or more of them to provide an organic solvent solution thereof wherein to mill the carbon black to apply over its particles a mono-layer of adsorbate, are such substances as plasticizers, e.g. di-(2-ethylhexyl)phthalate, or stabilizers (e.g. organic phosphates) for the resin, or other organic ingredients to be used along with a film-forming resin to prepare the film-forming multi-phase resin-complex, from which to form the film, such as dispersing agents (e.g. the "Triton X–45" alkyl aryl polyethoxy alcohol, or fluoro and silico organic surfactants, and any others) compatible with the ingredients for such film, and still other substances which may be used as ingredients in preparing such film, e.g. resin monomers and other compatible organic substances, any of which is soluble in the solvent to be used in the mono-layer adsorption step.

Including such other adsorbates, in making the mono-layer, gives the final conductivity for the film-providing multi-phase resin-complex characteristics based on their respective type properties. Thereby the resulting recording blanks can show recording properties which also stem from the use of these respective types of adsorbates. For example, different characteristics are required for a non-strippable recording blank than for a strippable blank.

The invention embraces also the resulting improved electric-signal-responsive film, whether as a coating or layer for a recording blank or as an unsupported film, having dispersed in it the improved carbon black particles coated with an adsorbed mono-layer of an organic adsorbate which in its free state is soluble in an organic solvent which is compatible with the organic solvent vehicle selected for the film-forming multi-phase resin complex, and from which the film is to be formed.

Thus, a further embodiment of the invention is a recording blank, such as a recording sheet, stencil or printing screen, which recording blank comprises an improved electric-signal-responsive film having incorporated in it mono-layer-organic-adsorbate-coated carbon black particles.

By "suspending or film-forming multi-phase resin-complex" is meant a mixture of resin particles in a solution of a film-forming resin (wherein the carbon black will be dispersed), whether the resin particles be (i) solid or (ii) merely swollen and containing imbibed solvent, said particles having about the same physical properties (e.g. density, size, electric charge, and surface behavior) although not necessarily the same chemical composition, which the resin particles in solution had before being dissolved. The preparation of such multi-phase resin-complex and the way of noting its presence is described still further below.

An important embodiment of the invention is the enhancement of the recording effectiveness of finished electrical-signal-responsive films, by providing that the final conductive-film providing suspension comprise a multi-phase resin complex whether that final suspension is prepared by using carbon black particles which (i) were preliminarily separately treated with a solution of an adsorbate in an organic solvent to give them an adsorbed mono-layer, or (ii) were milled without such preliminary treatment directly in a liquid medium comprising all of the film-forming resin and all of the solvent needed to enable forming the multi-phase resin-complex.

In the prior art milling, all of the carbon black is milled in a solution of a film-forming resin in a volatilizable solvent for it as a whole at one time. This conveniently may be called "bulk" or "all-in-one" milling. The electric-signal-responsive films prepared by using the prior art bulk or all-in-one milling of the carbon black show certain undesirable limitations. For example, all too frequently they manifest poor recording with indistinct perforations of irregular size even though produced by the same power input, and also absence of perforations which should have formed. They also exhibit undue weakness due to their low tensile strength stemming from excessive curburization around the perforations. Reproductions from stencils vary from copy to copy due to poor ink flow because many perforations remain full of ink.

These shortcomings are overcome by conducting the bulk or all-in-one milling of the carbon black according to this invention under conditions that provide for the dispersion of the original carbon black particles, during the milling in a film-forming multi-phase resin-complex, as more fully described further below.

Further improvement is provided in the obtainable final properties of the desired electrical-signal-responsive films (for the earlier above mentioned various types of ultimate products) by preparing these films by the two-stage carbon black coating-dispersion procedure embodiment of this invention. In that procedure the solvent (used in the first stage), and any excess resin or other adsorbate dissolved in that solvent, over that which will be adsorbed as a mono-layer on the carbon black particles in the first stage, have to be compatible with the constituents of the suspending or film-forming multi-phase resin-complex used in the second stage.

That solvent and dissolved adsorbate also are so proportioned to these latter constituents that when they are admixed and thus become the finished carbon black film-providing dispersion, otherwise called the conductive-film-providing dispersion or suspension, the conductive-film then remaining after evaporation of the solvent vehicle contains the planned concentration of carbon black substantially uniformly incorporated throughout the dried, set or fixed film (coating or layer) with adequate adhesion, flexibility and strength.

U.S. Patents 2,555,321, 2,664,043, 2,664,044, and others show that for the type of recording blanks or stencils responsive to electrical signals such as telefacsimile, telegraph signals, and the like, applied by use of a single stylus or multiple styli, the preparation of the prior art all-in-one or dissolved resin carbon black dispersions for making the electrically conducting coatings or films was "not limited to any particular method of preparing" (from Patent 2,664,043, column 6, lines 8–9).

Such prior art recording products having the conducting coatings as then available perform satisfactorily for some of the ordinary purposes. However, in addition to their other limitations, they cannot enable recording at very high speeds. Moreover, the resolution provided by their recorded electrical signals is unsatisfactory and inadequate to enable their use in exacting applications such as silk screen printing and electrostatic printing.

Thus, the prior art electrically conducting films (layers or coatings) lack much that might be desired. For example it can be considered that it should be possible to record transmitted electrical signals at the rate of about 10,000,000 (ten million) signals per second. Yet the prior art products can record such signals with acceptable resolution only at the rate of about 10,000 (ten thousand) per second.

One of the sources for this vast restriction and difference in results stems from the vibration mechanically induced in the recording stylus by the unevenness of the contacted (by it) adjacent surface of the coating on the recording blank or stencil which during the recording process is moved past the stylus at a speed of about 50 inches per second.

However, when in the steps preliminary to this invention an apparently smooth coating surface was provided, it occurred that only a slight but not measurable improvement could be noted in gaining either better resolution or higher recording speed. This indicated further that there were involved other factors which continued to prevent attaining maximum efficiency.

Continuing the study leading to this invention showed that the carbon black dispersions of the prior art methods vary widely with milling time, or temperature reached by the dispersion during milling. Then also, even on obtaining a uniform dispersion, as shown by apparent absence of graininess, it occurred that with as little as even a few minutes of over milling or if the dispersion reached a temperature much above 80° F., the recording blank or stencils made with a coating from it gave poor resolution even at extremely low recording speeds.

Even with using extreme care in the "bulk" or "all-in-one" milling process of the prior art, the results vary from batch to batch because of milling conditions that vary only slightly but as to results significantly with each milling. Then also, adequate control over the milling of each batch is practically impossible to attain.

It also occurs that the different types of carbon blacks used in making the prior art (i.e. bulk or all-in-one milling) dispersions could give vastly different results.

For example, some carbon blacks showed rapid changes in their milling characteristics, which were manifested when the resulting dispersions were used to make films for a recording blank or stencil. That is due largely to the relative ease with which some carbon blacks and resins form dispersions which are difficult to control precisely in the prior art bulk or all-in-one milling operation, whereby available properties of the finished coatings (layers or films) cannot be reproduced repeatedly.

The foregoing difficulties strikingly show that the preparation of the carbon black dispersions is a problem and obstacle of utmost importance in the way of approaching what theoretically should be possibly attainable resolution and speed.

It is also found that signals applied to the prior art stencils to produce about 40,000 perforations per square inch (i.e. at 200 lines per inch and 200 voltage impulses per inch) with a voltage of about 300 volts on the stylus, produced an open area of about 15% to 18% with at least about 60% tensile strength reduction after perforation. Such reduction shows considerable electrical and thermal breakdown damage around the perforated area of the film. Open area is the ratio of perforated area produced during a recording to the total area before that perforation, as measured with a photoelectric photometer.

In addition, with stencils and recording blanks and similar products embracing electro-responsive coatings made with the prior art bulk or all-in-one carbon black dispersions, at increasing and high voltage recording or breakdown conditions the films show very erratic perforation or signal marking. However, corresponding films made with the two-stage carbon black dispersions according to this invention, under the same conditions of breakdown give smooth, uniform response as the recording or breakdown voltage is increased.

That feature of the invention is evidenced quite sharply in comparative recording of the test gray scale in stencil films, with the stylus voltage for recording the black being adjusted to a high level. On the stencil film with a responsive layer made with a prior art carbon dispersion, the black portion of the gray scale records only partially (due to erratic hole formation). However, the gray scale is recorded precisely, even in its black portion, by the stencil film having the two-stage carbon black dispersion hereof.

Thus, another and principal feature of the invention is that it provides carbon black dispersions that enable preparing such recording blank products as recording sheets, stencils, printing screens, unsupported electrically conducting films, and their like, free from the above noted and other disadvantages provoked by films wherein the heretofore available (bulk or all-in-one) carbon black dispersions were used. The resulting thus greatly improved recording sheets, stencils, printing screens, and conducting films also are part of this invention. Other features and advantages of the invention will be apparent from the detailed description of it below.

The two-stage carbon black dispersions of the invention enable providing repeatedly excellent recording sheets, stencils, printing screens, unsupported films, and like recording blanks which in responding to electrical impulses give resolution which is from at least equal, to significantly superior, to those heretofore available, and at greater recording speeds as high as 100 inches per second and with recording signals at the rate of about 60,000 per second and with 300 volts across the stylus. Such improved recording blank products are a valuable part of this invention.

It is indicated earlier above as to the first stage of the two-stage procedure that the mono-layer-providing resin adsorbate may be replaced by some other adsorbate to provide the particular mono-layer to be adsorbed on the carbon black in that first stage. However, as the resin quite likely may be used more often for that purpose, the steps in applying the mono-layer conveniently are described with the use of the resin for that purpose, but without any intended limitation on the applicable adsorbates.

Thus, the quantity of the selected carbon black to be used in making a planned batch of the final film-providing suspension first is milled with an amount of the selected adsorbate such as the resin and/or other adsorbate dissolved in an amount of a suitable solvent for it, at least equal to, and advantageously in excess of, that quantity of adsorbate which forms a mono-layer over the surfaces of all of the carbon black particles. The milling of the resulting mixture is continued until a smooth dispersion, that is to say, free of graininess (as determined, for example, by the customary laboratory bar technique), is formed.

As to what is a mono-layer, from considerable earlier work on adsorption of elastomers, e.g. butadiene-styrene (75 to 25 ratio) cold rubber on carbon black, it may be said in a relatively general vein that a mono-layer, as an approximate average of the earlier work indications, is about 140 angstroms thick with a weight ranging from about 20 to 260 milligrams per gram for a fine thermal (i.e. FT) carbon black of surface area 17 square meters per gram (EM, i.e. by electron microscope) to a super-abrasion furnace (i.e. SAF) carbon black of surface area 123 square meters per gram (by EM), respectively.

Thus, it is advisable to use excess resin or other adsorbate over that needed for a mono-layer because the exact quantity for such a layer cannot readily be precisely calculated. It varies with the specific carbon used and, in general, is in proportion to its surface area, and can be approximated by determining the adsorption isotherm for the particular resin or other adsorbate, as seen in "Interfacial Phenomena" by J. T. Davies and E. K. Rideal, Academic Press, New York, N.Y. (1963).

In any event, an excess of the resin is an advantage because it serves to reduce the required time for milling the carbon black in the resin solution. Thus, an excess of even 20 or 30 or more times the indicated quantity needed for a mono-layer can be used so long as the excess is not too extensively higher than such multiples as to interfere with the desired or required physical properties of the dried coating (layer or film) to be left on the finished product such as a recording blank, stencil or unsupported film.

That the mono-layer of resin cannot be significantly removed from the carbon black even by solvent extraction shows that that layer has so modified the carbon black to give it many advantageous properties. For example, heating the mono-layer-coated particles suspension to any temperature below the boiling point of the solvent for the resin or other adsorbate, and even relatively long milling during this first stage, no longer has any detrimental effect.

Also use of excess resin over that needed for a mono-layer, so long as it is not so great an excess, as is mentioned above, as to effect adversely the physical properties of the film (layer or coating) or the properties of the finished product made with it, results in shortening the adsorption time for applying the mono-layer over the carbon black. That time is relatively short, possibly in the range of about an hour or two especially when using a polymeric resin for the mono-layer. However, to assure avoiding graininess in the final film-providing suspension, it is desirable to have an overall combined milling and adsorption time, say, of about five to about twenty hours.

The initial mono-layer-applying stage also so modifies the carbon black and, in turn, any finally completed dispersions made with such carbon black that the resulting films thereby then provided in recording blanks such as recording sheets, stencils, printing screens, etc. or merely used as unsupported films, manifest greatly enhanced recording characteristics, as indicated shortly above. These characteristics also appear to be identified with the type of resin or other adsorbate in the mono-layer on the carbon black.

It is common for determining optimum milling conditions in the prior art bulk milling process of dispersing a particular carbon black in a resin solution, after a certain milling time to draw periodically separate samples of the dispersion and to test each for graininess, e.g. by observing a film formed by the well known bar technique; and even to test the film for its recording characteristics.

So also when a single adsorbate is, or a plurality of adsorbates are, to be used in the mono-layer forming stage, such tests initially also may need to involve preparing a number of coating films for a stencil or other recording blank from a conductive-film-producing suspension made with an initial mono-layer-adsorbate-coated carbon black dispersion using the particular adsorbate or plurality of adsorbates, so as to note the resulting respective recording behavior and thus to reach a choice for final formulation for the desired purpose.

Electrical conductivity is important in such a film (coating or layer). It can be determined by usually used measuring means. The distribution of carbon black in the same film also is of equal importance. This property has to be determined by following this last noted test procedure in order to examine and judge the obtained recording.

It has been found that when a plurality of adsorbates are used in the initial mono-layer forming stage, only one appears eventually to form the mono-layer. The substance or subsances not adsorbed, however, will remain in solution to modify the dispersion in various ways. For instance, if a resin and a high molecular weight dispersing agent constitute the additives to the solvent used in the first stage, both may be adsorbed partially in the early stage of the adsorption process. However, at equilibrium the resin probably would form the mono-layer with the dispersing agent functioning to modify the carbon black distribution in the dispersion. A resin monomer may not be adsorbed in the final part of the adsorption step, but under some conditions, e.g. heat, type of monomer, may act to form cross-links between mono-layers on the individual carbon black particles.

In any event, the resin used in the first stage, if different from the one used in the second stage, and any other adsorbate, when used in excess, must be compatible with the resin and solvent constituents of the second stage film-forming multi-phase resin-complex, and that must be so also as to the solvent used in the first stage.

The production of a recording stencil like that disclosed in the U.S. Patent 2,664,043 or a recording support or blank as shown in U.S. Patent 2,040,142 shows that some of the properties which the formulation used in the second stage of the method has to provide in the final product, such as a recording stencil or recording film, are stability in handling, strength to endure printing or duplicating operations, resistance to printing ink vehicle and to solvents used to clean a stencil or screen for storage purposes, etc.

The basic or continuity-providing structure of the film (coating or layer) of this invention can be made from a multi-phase resin-complex of any of the widely available number of pliable-film forming resins such as the synthetic resins and elastomers, for example, vinyl chloride polymers and copolymers, polyvinyl acetals, the polyvinyl resins such as vinyl chloride acetate copolymers, and vinylidene chloride polymers and copolymers, styrene polymers and copolymers, polycarbonates, polysulfonates, high strength elastomers, or mixtures thereof, and the like.

The continuity-structure-providing multi-phase resin-complex to be admixed with the first stage, i.e. mono-layer-adsorbate-coated, carbon black dispersion is prepared, for example, by dispersing any such film-forming resin in an organic solvent for it and compatible with the solvent in the carbon black dispersion, and at such a temperature that at least partial solution is obtained with from about 20% to about 80% of the resin remaining in a swollen dispersed state, the particle size of these resin particles, as determined by microscopic examination at 70 times magnification and after removal of the solvent, ranges from 1 to 50 microns with an optimum range of from 5 to 10 microns.

Suitable plasticizers, stabilizers, surfactants, fillers, and the like can be included to modify the final properties of the finished film to be provided by the overall resin part of the film-forming multi-phase resin-complex.

Preparation of a multi-phase resin-complex having the above characteristics can be attained readily by proper combination of selected solvents, temperature and mechanical treatment. Once the planned multi-phase resin-complex is obtained, it can remain in stable form for long periods of time so long as the temperature is held at the predetermined stability level as observed by microscopic examination during its preparation.

In general a clear (i.e. as prepared before dispersing carbon black in it) multi-phase resin-complex can be prepared by means of ball, roll, or colloid milling, or high shear impeller mixing, at a temperature such that only partial solution of the resin used occurs, the balance of the resin being dispersed in particulate form as either or both solid or merely swollen particles containing imbibed solvent, by the mechanical action of the dispersion means. Microscopic slides of the clear multi-phase resin-complex colored with a dye such as Iosol Black (made by National Aniline Division of Allied Chemical Corporation) can be used to observe the progress of the forming of the desired multi-phase resin-complex with resin particles within the content range and of the size disclosed (see column 7, lines 43–51). The dye colors the resin particles so that they can be easily seen and their percentage presence estimated from a suitable area measuring microscope slide as is already available.

A mixture of resin particles, be they solids or merely swollen particles containing imbibed solvent, contained within the above-noted size and content ranges in the liquid phase having in general the same physical properties but not necessarily the same chemical composition as the resin of the liquid phase, is the desired multi-phase resin-complex.

Then as the third and usually last step in preparing the conductive-film-providing suspension or finished carbon black coating dispersion, the initial stage mono-layer-resin-coated carbon black dispersion is admixed with the continuity-providing multi-phase resin-complex of stage two, either by agitation or ball milling for the short time, possibly only 15 or 20 minutes or so, sufficient to provide a uniform finished carbon black coating dispersion. This conductive-film-providing dispersion or suspension can be used or applied as disclosed in preparing any of the finished recording or reproducing products of the above-identified patents.

Typically illustrative, but not to be taken as restricting, examples of the first stage resin solution dispersion of mono-layer-resin-coated carbon black, are the following wherein all parts are by weight:

EXAMPLE 1

The following ingredients were milled in a ball mill for about 10 hours at 70° F.:

| | Parts |
|---|---|
| Polystyrene (average molecular weight about 100,000) | 5.0 |
| Methyl ethyl ketone | 200.0 |
| Channel black, United 5 (of United Carbon Co.) and | 13.0 |
| Stabilizer 53 (organic phosphate product of Victor Chemical Co.) | 0.2 |

By that time the carbon black particles absorbed a monolayer of polystyrene and the dispersion manifested a smooth texture free from graininess (as noted by the customary bar test).

EXAMPLE 2

The following ingredients were processed in the same way as in Example 1, with the same dispersion texture results:

| | Parts |
|---|---|
| Poly-(methyl methacrylate) resin #2041 (of E. I. du Pont de Nemours) | 7.0 |
| Methyl ethyl ketone | 200.0 |
| Furnace carbon black Vulcan C (of Cabot Corp.) and | 11.0 |
| Stabilizer 53 (organic phosphate) | 0.2 |

EXAMPLE 3

The following ingredients were processed in the same way as in Example 1, with the same dispersion texture results:

| | Parts |
|---|---|
| Styrene methyl methacrylate copolymer, Zealin 150 (of Dow Chemical Co.) | 3.0 |
| Methyl ethyl ketone | 200.0 |
| Channel black, United EPC (of United Carbon Co.) and | 12.0 |
| Stabilizer 53 (organic phosphate) | 0.1 |

EXAMPLE 4

The following ingredients were processed in the same way as in Example 1, with the same dispersion texture results:

| | Parts |
|---|---|
| Polyvinyl acetate VYAF (of Union Carbide Corporation) | 2.0 |
| Methyl ethyl ketone | 200.0 |
| Furnace black, Elftex 5 (of Cabot Corporation) and | 12.0 |
| Stabilizer 53 (organic phosphate) | 0.1 |

EXAMPLE 5

The following ingredients were processed in the same way as in Example 1, with the same dispersion texture results:

| | Parts |
|---|---|
| Vinyl chloride-acetate copolymer VYHH (of Union Carbide Chemicals Co.) | 5.0 |
| Methyl ethyl ketone | 200.0 |
| Channel black, United 5 and | 12.0 |
| Stabilizer 53 (organic phosphate) | 0.2 |

Other mono-layer-resin-coated or mono-layer-adsorbate coated carbon black dispersions can be prepared by replacing in part or as a whole the specific resin used in any of the separate Examples 1 through 5 by some other suitable resin or elastomer such as those mentioned earlier above, or at least in part and at times also as a whole by some other adsorbate, soluble in the solvent thereof or other compatible solvent. Such other resin or other adsorbate can be any of those, or any of the types, disclosed elsewhere herein and should be compatible with the ingredients of the film-forming multi-phase resin-complex and for the properties to be imparted and manifested by the continuity-providing structure of the finished dried electrically responsive film (coating or layer).

The (a) generally clear continuity-structure-providing multi-phase resin-complex of stage two, and the (b) finished carbon black coating dispersion or conductive film providing suspension resulting from admixing the stage one (i.e. mono-layer-resin-coated) carbon black dispersion with the clear multi-phase resin-complex of stage two are illustrated respectively in, but are not to be restricted to, the following wherein all parts are by weight:

EXAMPLE 6

Stage two clear multi-phase resin-complex 75 parts of vinyl chloride-acetate copolymer VYNS (of Union Carbide Corp.) were rotated in a ball mill for about 5 minutes. Then there were added to it the following ingredients:

| | Parts |
|---|---|
| Dioctyl phthalate (plasticizer) | 15.0 |
| Calcium-2-ethylacetoacetate acetate (stabilizer) (Union Carbide Corp.) | 1.0 |
| Methyl ethyl ketone | 560.0 |
| Methyl isobutyl ketone and | 160.0 |
| Stabilizer 53 (organic phosphate) | 2.0 |

Rotation of the ball mill then was continued, and its contents heated to about 80° F., until a smooth multi-phase resin-complex with the stabilizer well dispersed in it was obtained, having approximately 50% of the resin dissolved with the balance being in the form of swollen resin particles (which in a dry state measured approximately from 1 to 50 microns as determined with a microscope at 70 magnification). This multi-phase resin-complex was obtained at the end of approximately 12 hours of milling. In storing this multi-phase resin-complex it must be kept at not over 80° F. for stability.

EXAMPLE 7

Clear multi-phase resin-complex of vinylidene chloride-acrylonitrile copolymer 75 parts of vinylidene chloride-acrylonitrile copolymer, i.e. "Saran F 120" (of Dow Chemical Co.), were rotated in a ball mill as in Example 6 to produce a multi-phase resin-complex as described in it. To the copolymer were added the following agents and the process continued as in Example 6:

| | Parts |
|---|---|
| Dioctyl phthalate (plasticizer) | 20.0 |
| Calcium-2-ethylacetoacetate acetate (stabilizer) | 1.0 |
| Methyl ethyl ketone | 560.0 |
| Methyl ethyl butyl ketone and | 160.0 |
| Stabilizer 53 (organic phosphate) | 2.0 |

EXAMPLE 8

Clear styrene butadiene copolymer multi-phase resin-complex 75 parts of styrene butadiene copolymer, i.e. "Styron 475" (Dow Chemical Co.), were rotated in a ball mill as in Example 6 to produce a multi-phase resin-complex as indicated in it. To this copolymer then were added the following ingredients:

| | Parts |
|---|---|
| Dioctyl phthalate (plasticizer) | 20.0 |
| Calcium-2-ethylacetoacetate acetate (stabilizer) | 1.0 |
| Methyl ethyl ketone | 560.0 |
| Methyl isobutyl ketone and | 160.0 |
| Stabilizer 53 (organic phosphate) | 2.0 | and their treatment was carried out as in Example 6 to provide still another example of the stage two continuity-structure-providing multi-phase resin-complex.

Other suspending or flexible film-forming multi-phase resin-complexes can be made by the person of ordinary skill in this art by making suitable compatible modifications or additions in any of Examples 6, 7 and 8, or in any others like them formulated with any of the other resins disclosed earlier above or shown in the prior art for a flexible film-forming resin solution for use in preparing an eletcrically-responsive film (layer or coating) for the same kind of end product.

EXAMPLE 9

Conductive-film-providing suspension (from both Examples 5 and 6)

The fluid mono-layer-resin-coated carbon black dispersion of Example 5 then was added to the multi-phase resin-complex product of the balling mill in Example 6, and rotation of the ball mill was continued until a uniform conductive-film-providing dispersion was obtained, in about 10 minutes.

Other conductive-film-providing suspensions can be prepared by similarly ball mill admixing (a) the mono-layer-adsorbate-coated carbon black dispersion of any of Examples 1 through 5 and any of the indicated possible modifications of any thereof with (b) the clear suspending or flexible film-forming multi-phase resin-complex of any of Examples 6 to 8 and any of the indicated possible modifications of any of them.

FIGURE 1 is photomicrograph (magnification approximately 70×) of the conductive-film-providing suspension of Example 9, wherein the solid or swelled state resin particles, after drying, measure from about 1 to about 50 microns. It is not known precisely what function the resin particles of the multi-phase resin-complex, remaining in the dry applied film, perform during electrical recording. However, this photo micrograph shows the carbon black collected in an encircling layer or cloud around the individual resin particles. For the resulting stencil or screen to respond precisely to the applied recording voltage, this structure is essential.

While a multi-phase resin-complex has been disclosed herein for use in the two-stage milling operations, its use also is essential in the procedure wherein the carbon black particles are to be milled in only one operation in a liquid medium comprising all of the film-forming resin and all of the solvent needed to enable forming the multi-phase resin-complex, if it is desired to produce recording or reproducing products which will respond with precision to the voltage breakdown pulses. Therefore, the invention is not to be restricted to the two stage milling operation in so far as use of a multi-phase resin-complex is concerned. Thus, the invention includes the use of a film-forming resin also in multi-phase resin-complex form for the production of the final conductive-film-forming suspensions or dispersions for the products to be made with a bulk or all-in-one milling operation.

Preparation of conductive-film-forming suspensions from film-forming resin converted to multi-phase resin-complex form in bulk milling operation is illustrated by, but not restricted to, the following examples wherein all parts are by weight:

EXAMPLE 10

75 parts of vinylite resin VYNW (of Union Carbide Corp.) were rotated in a ball mill for about 5 minutes. The following ingredients then were added to it:

| | Parts |
|---|---|
| Furnace black, Vulcan C | 11.0 |
| Dioctyl phthalate | 19.0 |
| Paraplex G-15 (Röhm & Haas, linear poleyster) product of sebacic acid and 1,2 propylene glycol | 6.0 |
| Methyl ethyl ketone | 750.0 |
| Methyl isobutyl ketone | 160.0 |
| Calcium-2-ethylacetoacetate acetate (stabilizer) and | 1.0 |
| Lead phosphate | 2.0 |

Rotation of the ball mill then was continued for about 24 hours, and maintained at a temperature of about 70° F., when the dispersion obtained was of a smooth texture free from graininess (as noted by a film cast with a laboratory bar coater).

EXAMPLE 11

75 parts of Geon resin 101 (B. F. Goodrich Chemical Co., polyvinyl chloride resin) were rotated in a ball mill for about 5 minutes. The following ingredients then were added to it, and the process continued as in Example 10:

| | Parts |
|---|---|
| Furnace black Vulcan 3 | 21.0 |
| Dioctyl phthalate | 17.0 |
| Paraplex G-25 | 5.0 |
| Methyl ethyl ketone | 750.0 |
| Methyl isobutyl ketone | 150.0 |
| Calcium-2-ethylacetoacetate acetate and | 1.0 |
| Lead phosphate | 1.0 |

By replacing any one or more of the ingredients used in either of Examples 10 and 11 by a comparable amount of a corresponding one of any of the other herein indicated respectively similarly functioning applicable substances and by similarly proceeding, other similar conductive-film-providing suspensions containing a multi-phase resin-complex of the film-forming resin in the dispersing solvent for it likewise can be prepared, and relatively simultaneously with coating of the carbon black particles with a mono-layer of the film-forming resin, in a single bulk ball-milling operation. These various conductive film providing suspensions thus obtained by such all-in-one single ball milling operation as in Examples 10 and 11 and the others obtained by the foregoing substitutions in them also indicate improved recording characteristics with likewise improved reproductions available from them.

Recording supports such as recording blanks, stencils, printing screens, and the like of the invention are illustrated by, but not limited to, the following examples of stencils embraced by the invention:

EXAMPLE 12

Stencil with an electric responsive layer prepared from Example 9 dispersion

The finished carbon black containing conductive-film-providing dispersion of Example 9 was applied in a manner as described in U.S. Patent 2,664,043 over a first conducting film formed on a belt or carrier and similar to that disclosed in Example 4A of that patent, to provide a combined single or unitary film having a graded resistance. Such combined unitary film thus made with the finished carbon black dispersion hereof should have a dry thickness of about 0.0005 to about 0.002 inch and a surface resistance, determined as there described, of from about 1000 to about 800,000 ohms.

If desired, a masking coating such as that of Example 2 of Patent 2,664,043 can be applied over this combined unitary conducting film. Then the overall thickness of the masking coating together with said combined unitary coating beneficially should not exceed 0.006 inch and advantageously should be between about 0.001 and about 0.003 inch.

Comparison of stencil of Example 12 dispersion and prior art stencil

A stencil of the type shown in FIGURE 8 of Patent 2,664,043 and made as described in it was recorded on a facsimile machine using 300 volts on the stylus and run at a speed of 50 inches per second with a line feed of 200 lines per inch. The recorded stencil so produced had an open area of 15% and showed a 70% reduction of tensile strength.

Then a similar stencil but prepared as in this Example 12 by using the finished conductive-film-providing dispersion of Example 9 above was recorded on the same facsimile machine described just above with the same voltage on the stylus and same line feed but at the higher rate of 100 inches per second. This so produced recorded stencil showed an open area of 20% but with only a 50% reduction in tensile strength; thereby demonstrating the marked, significantly enhanced properties of the coating films prepared by the two-stage method of this invention, as well as those of the resulting products such as recording stencils and the like produced with such a coating or layer.

That the greatly enhanced recording characteristics provided by this invention to such recording blank products as recording sheets, stencils, unsupported films, and the like, can be identified with the type of resin adsorbed as mono-layer on the carbon black and the presence of a multi-phase resin-complex is shown by the following:

EXAMPLE 13

Stencil with conductive-film-providing suspension (of Examples 1 and 6 products admixed)

A stencil made as described in Example 12 but by using a continuity-structure-providing suspension prepared by admixing the mono-layer-resin-coated carbon black dispersion of Example 1 and the stage two clear multi-phase resin-complex of Example 6, was recorded on a facsimile machine as described in Example 12 at a recording speed of 100 inches per second. The thus produced recorded stencil had an open area of 30% with only a 50% reduction in tensile strength.

The latter stencil with its 30% open area and only 50% tensile strength reduction shows that use of polystyrene (100,000 average mol. wt.) as the mono-layer adsorbate on channel carbon black "United 5") as in Example 1, enables producing a stencil which is superior to the one of Example 12, in the production of which the vinyl chloride-acetate copolymer VYNS was used as the mono-layer adsorbate on the same channel black ("United 5") as in Example 5.

The stencils of both of the Examples 12 and 13 were made with the same stage two clear multi-phase resin-complex of Example 6. While the stencil of Example 12 is not as good as the stencil of Example 13, it is superior to the stencil obtained by using a carbon black suspension prepared by the prior art bulk or all-in-one milling process as shown by the comparison given after Example 12, in which process the resin is used in solution.

Other stencils can be made by replacing the suspension used in Examples 12 and 13 similarly by any of the other conductive-film-providing suspensions prepared according to the contents of the paragraph immediately following the single paragraph of Example 9, as well as by those prepared according to Examples 10 and 11 and the contents of the paragraph immediately following the formulation for Example 11. All of these other different stencils are included herein as if their preparation was fully recited herein, to avoid unduly extending this specification.

So also, other recording blanks such as recording sheets are made by art disclosed procedures from all of the hereinabove in any manner described conductive-film-providing suspensions of this invention; and such recording sheets are thus included herein by reference as if their preparation was fully recited herein, again to avoid further extending this disclosure.

Likewise, printing screens are prepared by laying their foraminous structures of any of the materials suitable for them, e.g. those initially above-mentioned including also relatively porous paper such as Yoshina paper, in a layer of any of the in any wise herein-described conductive-film-providing suspensions hereof, for example, by procedures known from the fabric or paper coating arts respectively, and allowing the solvent content of the suspension to evaporate off.

All such resulting printing screens thereby having their pores laid in with an electric signal responsive film of this invention, comprising either (i) the mono-layer-adsorbate-coated carbon black incorporated within a dry film of a film-forming resin as cast from a conductive-film providing suspension comprising the resin in the form of a multi-phase resin-complex, or (ii) the all-in-one carbon black dispersed within a dry film of such resin as cast from a conductive-film-providing suspension comprising a multi-phase resin-complex of the resin and the organic solvent, are thus likewise included herein by reference as if the details of their preparation were recited in full—thereby avoiding still further extending this specification.

As noted earlier above, the multi-phase resin-complex is essential not only in the two-stage, but also in the single operation bulk, procedure as practiced under this invention, for preparing the continuity-structure-providing suspension from which is prepared the electric-signal-responsive film for the various types of recording blanks. That is so because the multi-phase resin-complex contributes the basic improvement in the final electric-signal-responsive film obtained by either course.

While that aspect of the invention is described as applicable to both embodiments resulting in the continuity-structure-providing suspension yielding the final films, more of the disclosure appears to be directed to the so-called two-stage embodiment for providing such suspension with its mono-layer-adsorbate-coated carbon black because its use contributes to improvement in enhanced recording speed and the refinement in the hole size produced in the resulting recording blanks such as stencils or silk screens. The two-stage route also enables using a different resin in each of the stages, and in addition allows closer control of the formation of the mono-layer adsorbate as well as of the multi-phase resin-complex.

As the various applicable film-forming resins currently appear to be commercially available in particle sizes of about 50 microns and smaller, the film-forming resin can be used in that particle size for providing the multi-phase resin-complex in either the (i) single operation (one-stage) or (ii) two-stage course for providing the resin-complex.

In either case, it is possible that the part of the resin present in particulate form may be provided by separately adding to the dispersion of the film-forming resin in the selected organic solvent dispersion vehicle for it particles of from about 1 to about 50 microns size of a different resin insoluble or only soluble in part in that solvent vehicle.

For the two-stage continuity-structure-providing suspension, the film forming resin used in the second stage may differ from, so long as it is compatible with, the resin used in the first stage.

While the invention has been explained by detailed description of certain specific embodiments of it, it is understood that various modifications or substitutions may be made in any of them within the scope of the appended claims which are intended also to cover equivalents of any of these embodiments.

What is claimed is:

1. The method of preparing the electric-signal-responsive film for a recording blank, which method comprises
   (a) preparing a continuity-structure-providing suspension comprising carbon black particles dispersed in a film-forming multi-phase resin-complex comprising as its essential constituents a continuity-structure-providing film-forming resin effective for said signal-responsive film and a volatile organic solvent wherein the resin content of said complex is only partially dissolved thereby to provide in said multi-phase resin-complex from about 20 to about 80 percent of its resin content in particulate form as at least one member of the class consisting of (i) solid particles and (ii) particles swelled with imbibed solvent, said particles in the dry state free of solvent being from about 1 to about 50 microns in size; and
   (b) applying a layer of said suspension over a surface whereon the desired signal-responsive film is to be formed, and allowing the volatile solvent content of said layer to evaporate off.

2. The method of preparing a film, as claimed in claim 1, wherein the surfaces of the individual carbon black particles dispersed in said resin-complex are coated with a mono-layer of a volatile oragnic solvent-soluble organic adsorbate which is (i) compatible with the film-forming capacity of said film-forming resin of the multi-phase resin-complex, and (ii) applied over said carbon black particles surfaces from a solution of said adsorbate in a volatile organic solvent which is compatible with the solvent of the liquid phase of said resin-complex.

3. The method of preparing an electric-signal-responsive film, as claimed in claim 2, wherein said continuity-structure-providing suspension is prepared by (i) separately perparing a mono-layer-absorbate-coated carbon black dispersion to provide the carbon black constituent of said film, (ii) also separately preparing a multi-phase resin-complex comprising as its essential constituents a continuity-structure-providing film-forming resin effective for said signal-responsive film dispersed in a volatile organic solvent wherein said resin is only partially dissolved; and (iii) admixing said carbon black dispersion and said resin-complex in both relative proportions to one another and for a time sufficient to provide said continuity-structure-providing suspension; the preparation of said adsorbate-coated carbon black comprising grinding starting carbon black particles into a solution of an organic-solvent-soluble adsorbate in a volatile organic solvent for it and compatible with the solvent wherein said film-forming resin is dispersed, and until said particles are substantially completely dispersed and their surfaces become coated with a mono-layer of said adsorbate.

4. The method of preparing a film as claimed in claim 3, wherein the mono-layer-adsorbate is at least one volatile organic-solvent-soluble film-forming resin.

5. The method of preparing an electric-signal-responsive film, as claimed in claim 1, wherein the preparation of said continuity-structure-providing suspension comprises agitating a quantity of a continuity-structure-providing film-forming resin and a quantity of carbon black particles suitable for use for said film, in said volatile organic solvent, continuing the agitation until (a) said carbon particles become coated with a mono-layer of said resin and said multi-phase resin-complex forms and (b) the mono-layer-resin-coated carbon black particles are substantially completely dispersed in said resin-complex suspension produced by said agitation.

6. An electric-signal-responsive film which has a resinous film body and carbon black particles dispersed within said film body which, when examined under magnification and in a thickness of it low enough for examination at a suitable enlargement such as a magnification at 70 times, shows individual resin particles in size range of from about 1 to about 50 microns surrounded by a cloud of carbon black particles.

7. An electric-signal-responsive film as claimed in claim 6, wherein the size range of said individual resin particles is from 5 to 10 microns.

8. A film as claimed in claim 6, wherein said film body comprises more than one continuity-structure-providing film-forming resin.

9. A film as claimed in claim 6, wherein said resin comprises a vinyl polymer or vinyl copolymer or mixtures thereof.

10. A film as claimed in claim 9, wherein said polymer is a methacrylate or copolymer or mixtures thereof.

11. A film as claimed in claim 9, wherein said polymer is a styrene polymer or copolymer or mixtures thereof.

12. A recording blank comprising an electrical-signal-responsive film as claimed in claim 6.

13. A stencil comprising an electrical-signal-responsive film as claimed in claim 6.

14. A printing screen, comprising a printing screen the pores of whose foraminous structure are laid in with an electric-signal-responsive film as claimed in claim 6.

15. The method of producing a conductive-film-providing suspension containing continuity-structure-providing film-forming resin, which method comprises:
 (A) producing a mono-layer-adsorbate-coated carbon black dispersion prepared as hereinbelow described;
 (B) preparing a multi-phase resin-complex having (a) a liquid phase which is a solution of the continuity-structure-providing film-forming resin and is to serve for forming the desired film and said resin being effective for said film, in a volatile organic solvent for said resin and compatible with the liquid phase of said carbon black dispersion, and (b) a solid phase of film-forming resin provided by having in said resin-complex resin content which is only partially dissolved in said solvent of its liquid phase thereby to provide in said resin-complex from about 20 to about 80 percent of its resin content in particulate form as at least one member of the class consisting of (i) solid particles and (ii) particles swelled with imbibed solvent, said particles in the dry state free of solvent being from about 1 to about 50 microns in size; the preparation of said adsorbate-coated carbon black comprising grinding starting carbon black particles into a solution of an organic-solvent-soluble adsorbate in a volatile organic solvent for it and compatible with said solvent for said film-forming resin, and until said carbon particles are substantially completely dispersed and their surfaces become coated with a mono-layer of said adsorbate; and
 (C) admixing said carbon black dispersion and said resin-complex.

16. The method as claimed in claim 15, wherein said adsorbate comprises at least one volatile organic-solvent-soluble film-forming resin.

References Cited

UNITED STATES PATENTS 2,664,043  12/1953  Dalton _____ 117—69

FOREIGN PATENTS 100,388  2/1937  Australia.

ALLAN LIEBERMAN, Primary Examiner

U.S. Cl. X.R.

101—128.2; 106—30.7; 117—35.5, 226; 260—34.2; 346—135

UNITED STATES PATENT OFFICE
CERTIFICATE OF CORRECTION

Patent No. 3,509,088    Dated April 28, 1970

Inventor(s)   HAROLD R. DALTON

It is certified that error appears in the above-identified patent and that said Letters Patent are hereby corrected as shown below:

Column 2, line 9, "absorbate" should read -- adsorbate -- . Column 3, line 31, "curburization" should read -- carburization -- . Column 8, line 45, "absorbed" should read -- adsorbed -- . Column 10, line 45, "eletcrically" should read -- electrically -- ; line 66, after "is", insert -- a -- ; line 73, "photo micrograph" should read -- photomicrograph -- . Column 14, line 53, "oragnic" should read -- organic -- ; line 63, "absorbate" should read -- adsorbate -- .

Signed and sealed this 18th day of December 1973.

(SEAL)
Attest:

EDWARD M. FLETCHER. JR.
Attesting Officer

RENE D. TEGTMEYER
Acting Commissioner of Patents